United States Patent
Cook et al.

[15] 3,643,370
[45] Feb. 22, 1972

[54] DIVING SINKER MEMBER

[72] Inventors: John W. Cook, 1512 South 11, Mount Vernon, Wash. 98273; Lester M. Davis, Gig Harbor, Wash.

[73] Assignee: said Cook, by said Davis

[22] Filed: Aug. 12, 1970

[21] Appl. No.: 63,230

[52] U.S. Cl. ............................43/43.13, 43/43.12, 43/43.14
[51] Int. Cl. .....................................................A01k 95/00
[58] Field of Search .....................................43/43.13, 43.12

[56] References Cited

UNITED STATES PATENTS

| | | | |
|---|---|---|---|
| 2,924,907 | 2/1960 | Hamilton | 43/43.13 |
| 3,401,483 | 9/1968 | Bellah et al. | 43/43.13 X |
| 3,466,787 | 9/1969 | Collins | 43/43.13 |
| 3,583,089 | 6/1971 | Scarbro | 43/43.13 |

Primary Examiner—Samuel Koren
Assistant Examiner—Daniel J. Leach
Attorney—Clinton L. Mathis

[57] ABSTRACT

A diving sinker comprising a flat surface deck member and a keel extending downwardly therefrom, which may be integral and molded from a plastic. A support extends upwardly from a longitudinal midportion of the deck and terminates in one-half of a frictionally engageable and detachable coupling member. Link means has one end thereof swingingly connected to the forward end portion of the deck member and has the other end portion thereof terminating in the other half of the frictionally engageable and detachable coupling member. Adjusting means is provided for said coupling member to adjust the frictional engagement between the two halves thereof. Fishing line receiving means is carried by an upper portion of said link means and the fishhook means and other fishing gear are connected to the trailing end portion of said deck member.

8 Claims, 7 Drawing Figures

PATENTED FEB 22 1972 3,643,370
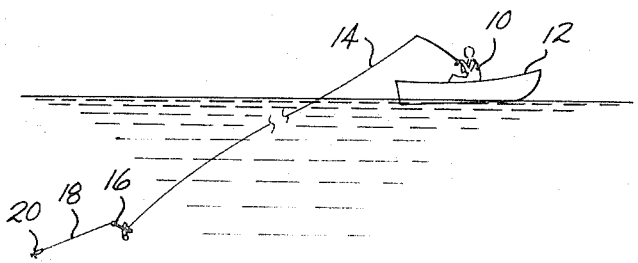
Fig. 1.
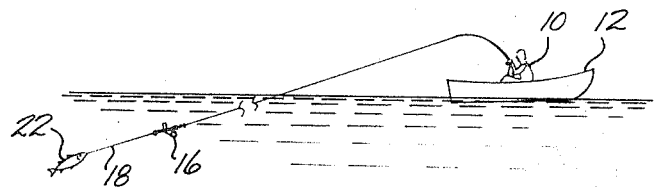
Fig. 2.
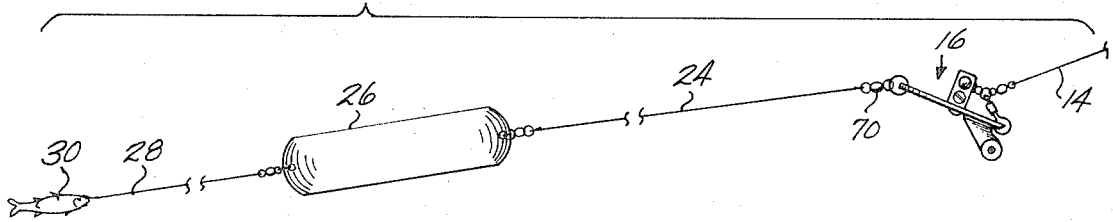
Fig. 3.
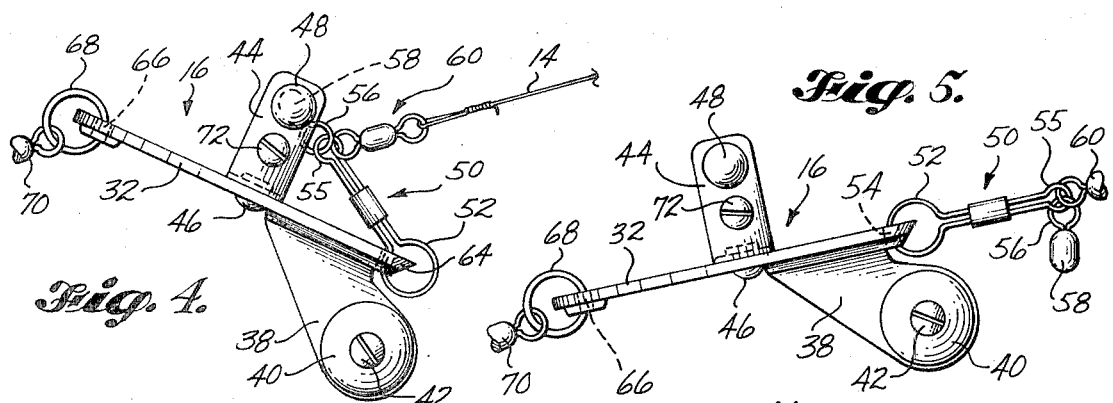
Fig. 4.
Fig. 5.
Fig. 6.
Fig. 7.
INVENTORS,
JOHN W. COOK
LESTER M. DAVIS
BY
Clinton L. Mathis
ATTORNEY

DIVING SINKER MEMBER

This invention relates to a diving sinker member. More particularly, this invention relates to a diving sinker member having a flat surface deck member which functions to cause the sinker member to dive because of the angle of presentation of the deck member to the water relatively moving past the deck member. During trolling, the boat and fishing gear (line, diving sinker, etc.) move relative to the water. If the boat is anchored in moving water, the water will move relative to such fishing gear. Also, if the boat is anchored in still water, the line may be pulled in to provide movement of the fishing gear to the water. In all such instances, we have relative movement between the water and the sinker member. This invention is provided with releasing mechanism responsive to an intentional pull or jerk on the fishing line so that the device presents no angle between its deck and the water moving relatively past its deck during retrieving of the fishing line and the fishing gear attached thereto.

Heretofore, diving sinkers, such as that illustrated and described in U.S. Pat. No. 2,235,868, issued Mar. 25, 1941, to L. E. Coolidge et al. were known and used. The mode of operation of such lures depended upon the fish striking the lure to release or cause the lure to change from a diving position to a position of planing to come to the surface during the retrieving or reeling in of the fishing line.

A major shortcoming of such type of diving sinkers is that the line is reeled in very many times, and without a fish striking, to: check the action of the lure; to check if the hook is still baited, if live bait is being used; to remove seaweed or kelp from the fishing line or the fishing gear; to change the lures or to change other fishing gear; and for very many other reasons. The number of times that the device is tripped by a fish striking the fishing lure is, to the sad experience of most fishermen, relatively few compared to the number of times that the device should be tripped to aid in the reeling in of the line and sinker for other purposes than having a fish on the line.

Also, some of the prior art diving sinkers provide a structure relying on a sudden slackening of the line to cause a release or to change so that the sinker planes upwardly to the surface during retrieving of the fishing line. Such types could only function, and then not with uniformity of results, with certain specific fishing gear trailing the diving sinker. More specifically, such devices would not operate if such trailing fishing gear comprised dodgers and many types of spoons. Thus, a very serious shortcoming of such prior art devices was the limiting of the fishing gear which could be used. This was a most serious shortcoming, as above all, most fishermen want to make their own choice of the fishing gear regardless of the type of sinkers they use.

It is a primary object of this invention to provide a device which overcomes the above-mentioned shortcomings of the prior art and many more.

A further object of the invention is to provide a diving sinker comprising a flat surface deck member and a keel extending downwardly therefrom, which two parts may be integral and may be formed by molding from a plastic.

A further object is to provide a support which is connected to the said deck member at an intermediate position longitudinally thereof and which support extends upwardly and terminates in one-half of a frictionally engageable and detachable member, such as a pair of jaws.

Another object is to provide link means which has an eye end portion thereof swingingly connected to a forward end portion of the deck member and which has the other end portion thereof terminating in a second eye member which carries the other half of the frictionally engageable and detachable coupling member, such as a ball.

A further object is to provide adjusting means to adjust the frictional engagement between the two halves of the frictionally engageable and detachable coupling member so that the device may be adjusted to tow fishing gear of variable sizes and dimensions and which present variable drag when towed by said detachable coupling member.

It is a further object to provide fishing line receiving means carried by an upper portion of said link means and to provide fishhook and fish gear receiving means connected with the trailing end portion of the said deck member.

Other objects of this invention will become explicit or implicit as the description of this invention proceeds in connection with the drawings and during which description like reference numerals will relate to like parts and wherein:

FIG. 1 is a somewhat schematic view illustrating generally this invention as used during fishing;

FIG. 2 is a view similar to FIG. 1 but after a fish has struck and the device released for retrieving;

FIG. 3 is a fragmentary view, on a larger scale and showing the device in use with one type of conventional fishing gear, as a dodger and lure;

FIG. 4 is a view, on a still larger scale, showing a device of this invention in fishing position and with lines to and from the device broken away;

FIG. 5 is a view similar to FIG. 4 but with the device of this invention in release or retrieving position;

FIG. 6 is a plan view of the body portion of this invention and with the movable accessories removed; and FIG. 7 is an elevational view of the parts shown in FIG. 6.

Referring now to FIGS 1 and 2 of the drawings, a fisherman 10 and boat 12 illustrate a fisherman trolling or mooching for fish. The fishing line 14 is of any desired length, in accordance with fishing needs, and thus a broken line 14 is shown in FIGS. 1 and 2. The device 16 of this invention is shown only generally in FIGS. 1 and 2 and in more detail in the remaining figures. Also, in FIG. 1, a leader 18 and lure 20 are shown to illustrate one typical form of conventional fishing gear. As FIG. 1 represents the device 16 during fishing and FIG. 2 represents the device after a fish has struck, the lure 20 is shown in FIG. 1 of the drawings but the same is within the fish 22 in FIG. 2. The operation to release the device 16, so it assumes the relative position shown in FIG. 2, will be discussed in connection with later figures.

In FIG. 3, another typical hookup or form of conventional fishing gear is shown and in this instance a leader 24, of any desirable length, is disposed between the trailing end of the device 16 and a dodger 26. Also, a second leader 28 is disposed between the dodger 26 and the lure 30. The leaders 24 and 28 are shown broken to indicate a leader of any desired length. It is of particular importance to note that all conventional hookups or conventional gear may be employed in connection with this invention even though they may be of varying masses and provide varying drags. This is illustrated by the rather simple hookup of FIGS. 1 and 2 with very little drag and the more complex hookup of FIG. 3 with considerably more drag. The adjustment to take care of fishing gear of different masses and different drags will be discussed in connection with FIG. 7 of the drawing.

Preferably, said deck member is provided with a broad or wide forward end portion 34 (FIG. 6) and a tapered trailing portion 36 (FIG. 6). A keel member 38 connects with the underside of deck member 32 and extends downwardly and preferably also extends forwardly as respects said deck member 32. At the forward end portion of the keel member 38 are disposed sinkers 40 which are preferably lead and tapered circular members to provide a streamlined effect. Removable nut and bolt means 42 secure the sinkers 40, one on each side of the keel member 38. Preferably, the deck member 32 and keel member 38 are formed of plastic and molded in one piece. A suitably colored plastic material may be used and thus the device can have the desired suitable strength and color pattern for attractiveness. As will be hereinafter discussed, rivet means may be used in place of the nut and bolt means 42 and for the reasons subsequently mentioned.

A support 44 is secured to the deck member 32 by any suitable means, as by rivet means 46. In the form illustrated in the drawing, the support 44 comprises two spaced apart legs carried by the deck member 32 and which leg members extend upwardly therefrom and terminate in jaws 48.

Link means 50 comprises an eye member 52 which is swingingly mounted in an aperture 54 at the forward end portion 34 of the deck member 32. A second eye 55 of the link means 50 connects by swivel eye 56 with ball 58. While the drawing illustrates the ball 58 as being carried by link means 50 and the jaws 48 as being carried by support 44, the support 44 may carry a ball and the link means 50 may carry a jaw. The important feature is that the link means 50 and support 44 carry a frictionally engageable and detachable coupling member with half thereof carried by the link means 50 and the remaining half thereof carried by the support 44.

Fishing line receiving means is preferably in the nature of a conventional swivel member 60 disposed between fishing line 14 and an upper portion of said link means 50, as second eye 55. Incidentally, swivel eye 56 and ball 58, previously described, may be a portion of a conventional swivel member, as a swivel member 60.

The forward portion 34 of the deck member 32 is reinforced and is also preferably tapered to form tapered portion 64. The trailing portion 36 of the deck member 32 is also reinforced and preferably provided with an aperture 66 and eye member 68 is swingingly mounted through said aperture 66. A leader, such as leader 18 of FIG. 1 or 24 of FIG. 3, connects with eye member 68 through a conventional swivel and this is illustrated by the showing of the fragment 70 of a swivel in FIGS. 4 and 5.

When a fish strikes the lure 20 (hopefully often, but in practice not so often) or when the gear is reeled in for inspection (in practice relatively often), it is desired to release ball 58 from jaws 48 so that the deck member 32 will plane, as shown generally in FIG. 2 and in more detail in FIG. 5, and offer little resistance in the pulling in or retrieving of line 14. As some fishermen provide little gear (as is illustrated by FIGS. 1 and 2) between a diving sinker and the fishhook while others provide a great deal of gear (only partially illustrated in FIG. 3 between the same members), the pull or drag between the deck member 32 and the line 14 will vary over a wide range. In order that the structure will not trip inadvertently but will trip with a jerk on line 14, an adjusting means is provided for jaws 48. There is shown in FIG. 7 a headed, threaded adjusting screw 72, the shaft of which passes through one of the legs of support 44 and threadedly engages the other, to provide adjusted tension between the legs of support 44 and in turn between the jaws 48. Also, if desired, a locknut 74 may be employed to lock any adjusted tension.

Prior to the use of the device 16 in fishing, the spring tension of the jaws 48 is adjusted. It is desired that the amount of tension of the jaws 48 on the ball 58 shall be sufficient so that said ball 58 will not be released unless an intentional sudden jerk or pull is exerted on the fishing line 14. The normal pull or drag on the said line 14 is brought about by a plurality of variable factors which must be given due consideration in properly adjusting the adjusting screw 72. Such factors comprise: the amount and type of fishing gear between the device 16 and the lure 20 (as is somewhat depicted in comparing FIGS. 1 and 3 of the drawings); the kind and extent of the fishing line 14 (whether steel, monofilament, or woven and also the length thereof); the relative speed of the water to the boat 12; and the weight and relative position of the sinkers 40 to the deck 32. These factors are the principal ones which must be taken into consideration in adjusting the tension of the jaws 48 against the ball 58 so that said ball will be held until there is an intentional jerk or pull on the line 14, and at the same time, said jerk or pull may be held to a minimum.

If it is desired, the device 16 may be made of different sizes to dive to different depths and with different weight sinkers 40 for each size. This will lessen the variables in adjusting the adjusting screw 72. If different models and different weights are made, then the sinkers 40 would preferably be held in place by rivets rather than by the nut and bolt means 42.

During the use of the device 16 and when there is relative motion between the water and the device, the deck member 32 assumes an angular position to the horizontal, as shown in FIG. 4. The device is being relatively towed by a line connected with the device to a frictionally engageable and detachable coupling member, typified by jaws 48 and ball 58. During such towing, the situs of the connection is rearward of the forward portion 34 of the device and above the deck member 32. At the same time, the sinkers 40 are disposed forward of and below the deck member 32. Thus, the device will dive so long as there is relative motion between the device and the water until there is a balance of forces. The factors determining the depths of dive are the extent and nature of line 14; the size of the deck 32; the weight and position of the sinkers 40; and the nature and extent of the fishing gear trailing the device 16. As a practical matter, devices of this invention will dive to depths in the order of 150 feet with sinkers weighing ounces and the remainder of the gear well within practical and desirable limits. Thus, fishing depths can be reached with this device with sinkers weighing ounces which depths if reached by the use of sinkers alone, would require sinkers weighing pounds.

During fishing, it is often necessary to reel in one's line for reasons other than reeling in a fish as has been previously explained. During this reeling in procedure, the ball 58 must release from the jaws 48 so that the device assumes the position shown in FIG. 5 of the drawings and planes during the reeling in process; otherwise, the tendency of the device to dive would continue during reeling in and present a most difficult problem during reeling in and this, of course, is true whether or not the line is being reeled in because a fish has been caught or whether it is being reeled in for other purposes. Thus, certain and positive release upon desired conditions and release upon those conditions only is a positive must.

Every fisherman will have his or her ideas as to the best and most desirable fishing gears which must trail the sinker device, as the device 16. If the sinker device will not operate with each and all such fishing gear (some of which fishing gear may have or may not have dodgers, spoons, flashers and myriad of other fishing gear), the device is very limited in its use and to some fishermen it is of no use at all.

Thus, in a general way, there is provided by this invention a diving member comprising a flat deck member 32 having a keel 38 extending downwardly therefrom. Next, a weight means, as sinkers 40, is carried by said keel and preferably in the form of two sinkers 40, one on each side of the keel 38 and preferably the said sinkers are tapered and curved so as to present a streamlined object to relatively passing water. Also, preferably, the said sinkers are held in place by nut and bolt means 42 to provide for ready change of sinkers and thus ready adjustment. A vertically extending support 44 is carried by the deck member 32 and the upper part thereof provides jaws 48, which are one-half of a frictionally engageable and detachable coupling member. Link means 50 has one end portion thereof pivoted to the forward end portion of the deck member 32, as by eye member 52, and the other end portion thereof terminates in a ball 58, the latter being the other half of the frictionally engageable and detachable coupling member.

Fishing line 14 is received by the upper portion of the link means 50, through the second eye 55 thereof. The fishhook in the nature of lure 20 is connected with, through leader 18 of FIG. 1, or the more complex fishing gear of FIG. 3, the trailing end portion 36 of the deck member 32. Adjusting screw 72 is provided to adjust the tension between the ball part 58 and the jaw parts 48 of the detachable coupling member. Thus, the type of fishing gear that can be used following the device 16 is not limited and may be that desired by a fisherman, and after appropriate adjustment, the coupling member will not be inadvertently released and will be positively released only upon the intentional jerk or pull of the fishing line.

Obviously, changes may be made in the forms, dimensions, and arrangements of the parts of this invention without departing from the principle thereof, the above setting forth only a preferred form of embodiment of this invention.

We claim:

1. A diving sinker comprising a flat surface deck member; a keel member extending downwardly from said deck member; weight means carried by said keel member; a support carried by said deck member, extending upwardly therefrom, and terminating in a frictionally engageable upper end support portion; link means having its lower end portion swingingly connected with a forward end portion of said deck member, extending angularly upwardly therefrom, and having on its other end portion a coupling member frictionally and detachably engaging said upper end support portion; fishing line receiving means carried by the said other end portion of said link means; and fishhook means connected with the trailing end portion of said deck member.

2. The combination of claim 1, wherein said keel member also extends forwardly.

3. The combination of claim 1, wherein said weight means comprises two separate weight members disposed on opposite sides of said keel member.

4. The combination of claim 3, wherein said two separate weight members are detachably connected to said keel, permitting ready change of size of weight members.

5. The combination of claim 1, wherein said frictionally engageable support portion comprises a clip member and said coupling member comprises a ball.

6. The combination of claim 5, wherein an adjusting screw provides for adjusting the tension between two arms forming said clip member.

7. The combination of claim 5, wherein said link means comprises a metallic link, having at one end portion an eye swingingly mounted through an aperture at the forward end portion of the deck member and having at the other end portion a second eye; and said ball is connected by a swivel eye member to said second eye.

8. The combination of claim 1, wherein the connection of said fishhook means with the trailing end portion of said deck member comprises an eye member swingingly mounted through an aperture at the trailing end portion of the deck member; and swivel means carried by said eye member.

* * * * *